May 7, 1957 I. M. ROSS 2,791,760

SEMICONDUCTIVE TRANSLATING DEVICE

Filed Feb. 18, 1955

INVENTOR
I. M. ROSS
BY D. H. Wilson, Jr.
ATTORNEY

United States Patent Office 2,791,760
Patented May 7, 1957

2,791,760

SEMICONDUCTIVE TRANSLATING DEVICE

Ian M. Ross, New Providence, N. J., assignor to Bell Telephone Laboratories, Incorporated, New York, N. Y., a corporation of New York Application February 18, 1955, Serial No. 489,223

9 Claims. (Cl. 340—173)

Figure 1:
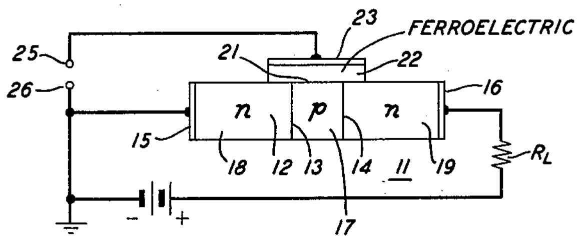

This invention relates to semiconductive signal translators and more particularly to switching devices which can be used to store information. The disclosures herein are related to those of J. A. Morton application Serial No. 489,241, entitled "Electrical Switching and Storage," filed herewith.

One object of this invention is to improve semiconductive devices which are employed for signal translation.

Other objects are to simplify apparatus for switching and storing information, to store information which can be read out without destruction, to alter selectively the conductivity of a circuit element by the application of a momentary electric impulse, and to maintain a circuit element in one of two conductive conditions without continuously expending energy.

In accordance with these objects, one feature of this invention comprises altering the conductivity of a path through a semiconductive body by polarizing a ferroelectric maintained in proximity to the body to alter the surface charge on a portion of that body.

Another feature resides in selectively eliminating or introducing a reverse biased rectifying barrier into a conducting path including a semiconductive body and a pair of electrodes thereto in accordance with a signal applied across a ferroelectric.

A further feature involves electrostatically introducing a shunting inversion layer across a pair of back-to-back n-p junctions to effectively eliminate the impedance of the reverse biased junctions from a current path including both junctions.

One specific embodiment of this invention involves the combination of a semiconductive element which exhibits a high impedance to current in either direction of conduction, by virtue of a pair of n-p junctions therein arranged in back-to-back relationship, with a ferroelectric body in proximity to the semiconductive material extending between the junctions, and means for polarizing the ferroelectric. A polarization of one sign on the ferroelectric next to the semiconductor creates a high conductivity path shunting the reverse biased n-p junction, while the opposite sign of polarization has little or no effect upon the impedance of that junction. Since ferroelectrics have an electrostatic hysteresis which results in the retention of some electrostatic charge therein characteristic of the polarity and, within limits, the magnitude of the electrostatic field applied thereto upon the reduction or removal of that field, the conductive state of the path through the semiconductor is sustained as a form of memory of the signal last applied. The conductive state can be switched rapidly, with rise times of from 10 to 100 microseconds, by applying a reversing field across the ferroelectric sufficient to overcome the remnant polarization. This new state will also be retained due to the reversed remnant polarization of the ferroelectric.

Figure 2:
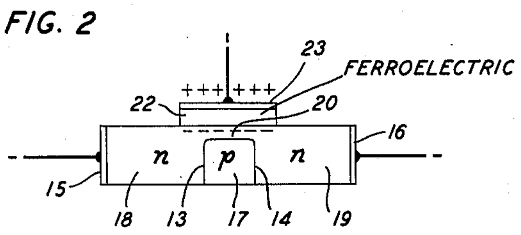
Figure 3:
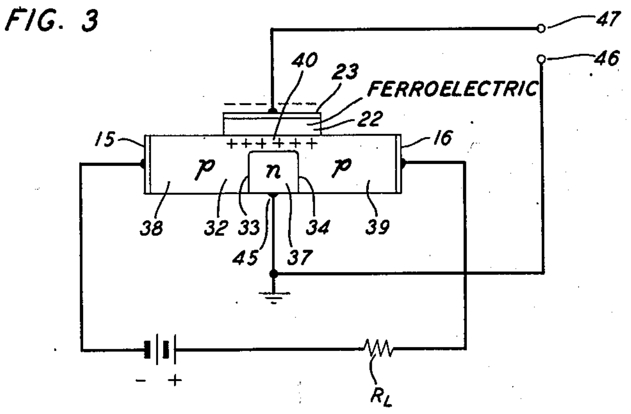

The above and additional objects and features of this invention will be more fully appreciated from the following detailed description when read in conjunction with the accompanying drawing, in which:

Fig. 1 is an elevation of one form of switching device constructed in accordance with this invention in combination with a schematically represented utilization circuit;

Fig. 2 is an elevation of the device of Fig. 1 showing the charge distribution and resulting junction modification for the low resistance condition of operation; and Fig. 3 is an elevation of a device according to this invention having its semiconductive elements and actuating charge corresponding in some respects but reversed in sign from that of Figs. 1 and 2, in combination with an alternative signal input circuit.

Referring now to the drawings, a circuit element 11 having bistable operating characteristics of the form of a high and low conductance state of the path between its contacts is shown in Fig. 1. This element is an electronic semiconductive body 12, preferably of single crystal material. It can be produced by conventional techniques such as growing a crystal on a seed by withdrawing it from a melt, and can be selected from a number of materials including silicon, germanium, tellurium, selenium, silicon-germanium alloys, intermetallic compounds of group III and group V elements, and the like. The body is provided with two rectifying barrier regions 13 and 14 such as those between contiguous n- and p-type regions of semiconductive material. A region of this nature hereafter will be termed an n-p junction and may be characterized as the region in which the rectifying process occurs or the region wherein the majority charge carrier concentrations, negative charge carriers, or electrons in n-type material and positive charge carriers or holes in p-type material, are effectively reduced, usually by a balancing process. Numerous techniques are known to the art for producing such junctions including the introduction of suitable materials by alloying and diffusion processes on the solid crystal or by addition to the melt from which it is derived prior to the freezing of the crystal.

The body 12, as shown in Fig. 1, contains two n-p junctions 13 and 14 in back-to-back relationship, so that in the absence of some control the device offers a high resistance to the passage of electrical current in either direction along the body length, since under all circumstances one junction is biased in the reverse direction of conduction. Electrodes 15 and 16 form low resistance, substantially nonrectifying connections to the body on the regions of like conductivity type, the n-type regions in the n-p-n structure of Figure 1, to define a current path therebetween including the n-p junctions 13 and 14. These electrodes may make large area contact with the semiconductor to reduce the resistance of the path, for example by plating and soldering or by alloying a material such as lead and arsenic therewith.

It may be noted that those structures depicted in the drawings are distorted in their proportions for purposes of illustration. A typical structure when formed by growing a single crystal body having two n-p junctions may be about one-quarter inch long and have a cross section about 10 mils thick and 100 mils wide. The ferroelectric control element is mounted on the wide face. It is effective in modifying the conduction of a large portion of the semiconductor. The junctions in such a device preferably are separated by a sufficient distance to avoid the delivery of substantial guantities of minority charge carriers injected by the forward biased junction to the reverse biased junction. Therefore, these barrier regions should be separated by greater than a minority carrier diffusion length. For example, a five mil separation is suitable when the minority carrier lifetime in the central region has been reduced, as by the addition of nickel thereto, to reduce the diffusion length to this level. A similar junction separation is utilized in devices formed by other techniques such as diffusion of impurities into a solid to convert surface portions to the opposite conductivity type as disclosed for example in the application of C. S. Fuller, Serial No. 414,272 filed March 5, 1954, and entitled "Fabrication of Semiconductive Bodies," or by the alloying of materials containing conductivity type converting materials as disclosed by the applications of W. G. Pfann, Serial Nos. 184,869 and 184,870, filed September 14, 1950, disclosing "Semiconductor Signal Translating Devices" or Patent 2,695,852 issued November 30, 1954, to M. Sparks, entitled "Fabrication of Semiconductors for Signal Translating Devices." As with the grown junction devices, the length of the end zones of semiconductive material in the alloyed or diffused devices is not significant for the purposes of this invention.

Control of the impedance of the body 12 between electrodes 15 and 16 from a high impedance state, preferably approaching the impedance of the reverse biased n-p junction 13 or 14 to a low impedance condition ideally at or below the resistance of the bulk material to which electrodes 15 and 16 are secured, is obtained by modifying the surface charge on the body over a surface portion of zone 17 intermediate junctions 13 and 14. In practice, the modification of surface charge also extends across junctions 13 and 14 and over a portion of the material of the end zones 18 and 19 of the body. As may be seen from Fig. 2, this modified surface charge, when of the proper polarity, functions to induce an inversion layer or channel 20 in a surface region of the semiconductive body between the n-p junctions 13 and 14 to effectively shunt those junctions by a low impedance path. Thus, the high impedance of the reverse biased junction is eliminated and the impedance between terminals 15 and 16 effectively corresponds to the sum of impedances of the bulk of zones 18 and 19 and channel 20.

The mechanism involved in the creation of a surface channel by a surface charge can be explained by considering the nature of electronic semiconductors. Such semiconductors are of two types, intrinsic and extrinsic. Extrinsic electronic semiconductors are either n-type or p-type. N-type material contains a predominance of mobile negative charge carriers or electrons available for conduction while p-type material contains a predominance of mobile positive charge carriers or holes. Intrinsic electronic semiconductors normally contain relatively few mobile charge carriers which will function in the conduction process, the electrons and holes being in near balance. In the body 12, shown in Figs. 1 and 2, the zone 17 is p-type and therefore normally contains a predominance of mobile positive charge carriers or holes. When a positive charge is developed adjacent surface 21, negative charge carriers within the semiconductor are attracted to that region. In p-type material these electrons tend to compensate the holes normally present therein, hence, if the surface charge is large enough to attract a number of electrons such that they exceed the holes, the mobile charge carriers then available for conduction in the surface region are electrons and the material is effectively converted to n-type conductivity. Thus, an inversion layer or channel 20 is created on the surface when the surface is charged and is eliminated when that charge is removed.

In accordance with the present invention, the reverse biased junction in a double junction structure as shown, can be eliminated as an impedance by mounting a ferroelectric body 22 in proximity to a surface of the body including a portion of the region bounded by n-p junctions 13 and 14 and applying signals to the ferroelectric to establish a charge upon its surface. The characteristics of ferroelectrics as a class of materials, as discussed in Chapter 7, pages 113 through 133 of Introduction to Solid State Physics by C. Kittel, John Wiley & Sons, Inc. (1953), are such that they exhibit an electrostatic hysteresis. The application of an electrostatic field along the electrostatic axis of a ferroelectric crystal induces an electrostatic charge which remains in the crystal at some level termed the remnant polarization when the field is removed. Thus, by employing the semiconductor body surface 21 as one electrode and a second electrode 23 as the plates of a condenser while the ferroelectric body 22 is positioned therebetween and applying a signal to input terminals 25 and 26 connected to electrodes 23 and 21, an electrostatic field can be developed across ferroelectric body 22 which results in a polarization thereof. The remnant polarization of this signal will be sustained even when the signal is removed. The application of a signal of opposite polarity which develops a field opposite that of the initial signal of sufficient magnitude will reverse the polarization. So long as the ferroelectric is polarized to a state maintaining a positive charge adjacent surface region 21, as by the application of a positive signal pulse to terminal 25, an n-type channel 20 will extend across the p-type zone 17 shunting reverse biased n-p junction 14 and the circuit element 11 will be in its high conductivity state. However, upon the application of a signal which creates a field overcoming the remnant polarization, the ferroelectric becomes oppositely polarized, its surface adjacent the semiconductor is charged negatively and remains in that state due to its characteristic remnant polarization. This induces a positive charge in the adjacent semiconductor surface region which has little effect upon the reverse impedance of the reverse n-p junction and permits it to maintain a relatively high value. The retention of the charge by the ferroelectric is not adversely affected by the conduction process through element 11; hence, the combination offers a bistable switch having memory in that it remains in the condition actuated by the last signal applied, which can be read by the passage of constant or modulated currents therethrough over long intervals without destroying the condition created by the signal.

Devices having the attributes of those shown in Figs. 1 and 2 can be constructed by employing opposite conductivity type material in the respective zones as shown in Fig. 3. In Fig. 3 the end zones 38 and 39 of body 32 are of p-type semiconductive material while the middle zone 37 bounded by n-p junctions 33 and 34 is of n conductivity type. This unit can be operated in a utilization circuit of the type shown in Fig. 1. It can be placed in the low resistance condition by inducing an inversion layer or p-type channel 40 across the zone 37 and junctions 33 and 34. This p-type channel results from a predominance of positive charge carriers attracted to the surface region on zone 37 by a negative charge adjacent that surface. Such a negative charge is established in the ferroelectric body 22 positioned in proximity to the surface of zone 37 by the application of a negative charge to electrode 23. Conversely, the application of a positive charge to that electrode sufficient to overcome the negative remnant polarization in the ferroelectric adjacent the surface of zone 37 eliminates the channel shunting the rectifying barrier and places the device in its high resistance condition.

While the p-n-p structure represented in Fig. 3 can correspond in all other respects to the n-p-n structure of Fig. 1, it will be noted that in the embodiment shown a third electrical connection 45 has been added to the center zone 37. This connection is advantageously of a low resistance, nonrectifying nature. It provides a means of realizing symmetrical operation of the device by enabling a signal to be applied across the ferroelectric without crossing a rectifying barrier. Thus, in this construction the signal is applied at terminals 46 and 47 and is independent of the output circuit. Similarly, a third connection can be applied to the n-p-n structure of Fig. 1 to eliminate the p-n junction 13 from the input circuit.

The preceding discussion has been directed generally to ferroelectric materials. While the common ferroelectrics can be employed as suggested, it has been found that semiconductive devices of the type described are particularly suited for combination with a ferroelectric body of guanidinium aluminum sulfate hexahydrate $$(CN_3H_6Al(SO_4)_2 6H_2O)$$

or one of the other isomorphous crystals including the guanidinium ion suggested as suitable for ferroelectric elements in the application of B. T. Matthias, Serial No. 489,193, entitled "Ferroelectric Storage Device" which was filed herewith. These materials have low small signal dielectric constants and low levels of saturation polarization. Hence, they can be employed in sizes which are readily fabricated and they will function in relatively low electrostatic field intensities. This second feature enables the devices to be operated with air filling the gap between the semiconductor and ferroelectric, although it is desirable, as discussed in more detail in the aforenoted application of J. A. Morton, to employ a flowable dielectric such as nitrobenzene or ethylene cyanide having a high dielectric constant, a high resistance to breakdown, a high resistivity, and a high stability as a gap filler.

Guanidinium aluminum sulfate hexahydrate is prepared with a face in the *c* plane which closely mates with the semiconductor surface, for example by cleaving, or lapping and polishing. The gap width between the ferroelectric and the semiconductor is reduced to a minimum by grinding and polishing the semiconductor to flatness. Thus, the gap width is preferably less than 0.1 mill. When subjected to a field of the order of 1500 volts per centimeter, guanidinium aluminum sulfate hexahydrate will produce a channel on the semi-conductor of the order of $10^{-5}$ centimeters thick. With this field, about $.35 \times 10^{-6}$ coulombs per square centimeter of surface charge will be induced in the semiconductor. The resulting change in conductance between the electrodes is a function of the product of electron mobility and induced surface charge.

In practice a device of the form represented in Fig. 1 has been fabricated by alloying lead-antimony bodies into opposite faces of a 44 ohm-centimeter p-type single crystal germanium body. These alloyed regions formed n-type germanium regions spaced by an intervening p-type region 0.050 inch thick. The body was then sectioned to reveal the n-p-n structure at a plane surface. A 10 to 15 mil thick cleaved crystal of guanidinium aluminum sulfate hexahydrate was mounted against the plane surface and bedded in a layer of ethylene cyanide so that the gap of about 0.1 mil between the ferroelectric and the semiconductor was filled therewith. The ferroelectric crystal was positioned over the p-type zone between the n-p junctions and of sufficient extent to extend over each junction. An electrode of silver paste was air dried on the exposed major face of the ferroelectric crystal. The unit was operated with up to 30 volts applied across metallic terminals fused in the lead-antimony alloy bodies. Signals of from 150 to 240 volts, poled to charge the portion of the ferroelectric adjacent the semiconductor positive, were sufficient to reduce the impedance between electrodes 15 and 16 to a level much below that experienced either in the unpolarized or oppositely polarized state and that impedance condition was observed to remain when the signal was removed and current was passed therethrough. Similar results have been observed using no additional dielectric in the gap between the ferroelectric and the semiconductor at somewhat higher signal voltages, about 600 volts.

It is to be understood that the above-described arrangements are illustrative of the application of the principles of the invention. Numerous other arrangements may be devised by those skilled in the art without departing from the spirit and scope of the invention.

What is claimed is:

1. Apparatus which comprises a body of semiconductive material including three contiguous zones of alternately opposite conductivity type, an n-p junction separating said contiguous zones, a body of ferroelectric material in close proximity to a surface portion of the middle zone, an electrical contact to each of said zones bordering said middle zone, and an electrode spaced from said semiconductive body and mounted against said ferroelectric body.

2. Apparatus which comprises a body of semiconductive material having a pair of zones of n conductivity type contiguous with an intermediate zone of p conductivity type, an electrical contact to each of said n-type zones, a body of ferroelectric material in close proximity to a surface portion of said p-type zone, and an electrode spaced from said semiconductive body and mounted against said ferroelectric body.

3. Apparatus which comprises a body of semiconductive material having a pair of zones of p conductivity type contiguous with an intermediate zone of n conductivity type, an electrical contact to each of said p-type zones, a body of ferroelectric material in close proximity to a surface portion of said n-type zone, and an electrode spaced from said semiconductive body and mounted against said ferroelectric body.

4. Apparatus which comprises a body of semiconductive material including a pair of zones of one conductivity type contiguous with an intermediate zone of the opposite conductivity type, n-p junctions separating each of said zones of said one conductivity type from said zone of opposite conductivity type, a surface of said body intersected by each of said n-p junctions, contacts to each of said zones of one conductivity type, a body of ferroelectric material in close proximity to said surface and extending across the surface of the zone of said opposite conductivity type at least to each of said n-p junctions, and an electrode spaced from said semiconductive body and mounted against said ferroelectric body.

5. Apparatus which comprises a body of semiconductive material including three contiguous zones of alternately opposite conductivity type, an n-p junction separating said contiguous zones, an electrical contact to each of said zones bordering the middle zone, and means positioned contiguous to the middle one of the three contiguous zones of the body for electrostatically introducing an inversion layer across the middle zone in response to an applied signal.

6. Apparatus which comprises a body of germanium including a pair of terminal zones of n-conductivity type and a zone of p-conductivity type having a thickness of the order of a few mils intermediate between and contiguous with said terminal zones, a body of guanidinium aluminum sulfate hexahydrate having its face within 0.1 mil of a body surface which includes a portion of each of said n- and p-type zones and extending between a surface portion of each of said terminal zones across a surface portion of said intermediate zone, and an electrode spaced from said germanium body and mounted against said body of guanidinium aluminum sulfate hexahydrate.

7. Apparatus which comprises a body of semiconductive material including therein a pair of rectifying junctions, the distance between said rectifying junctions being at least a minority charge carrier diffusion length, a body of ferroelectric material contiguous with a surface portion of the body extending between said rectifying junctions, a pair of spaced electrical connections to said body to regions including therebetween the pair of rectifying junctions, and an electrode spaced from said semiconductive body and mounted against said ferroelectric body.

8. Apparatus which comprises a body of semiconductive material including therein a pair of terminal zones of one conductivity type and intermediate therebetween a zone of opposite conductivity type, the width of the intermediate zone being at least a minority charge carrier diffusion length, a separate electrical connection to each of said three zones, a body of ferroelectric material in close proximity to a surface portion of the intermediate zone, and an electrode spaced from said semiconductive body and mounted against said ferroelectric body.

9. Apparatus in accordance with claim 8 in a further combination with means for applying a potential between the two connections to the two terminal zones, and means for applying a control signal between the electrical connection to the intermediate zone and said electrode mounted against the ferroelectric body.

No references cited.